United States Patent [19]
Haas et al.

[11] 3,938,821
[45] Feb. 17, 1976

[54] OCCUPANT KNEE RESTRAINT

[75] Inventors: Ronald H. Haas, Okemos; Roy J. Wohlscheid, Lansing, both of Mich.

[73] Assignee: General Motors Corporation, Detroit, Mich.

[22] Filed: Oct. 10, 1973

[21] Appl. No.: 404,986

[52] U.S. Cl............... 280/87 C; 280/150 B; 180/90
[51] Int. Cl.......................... B62d 1/18; B60r 21/02
[58] Field of Search........ 280/150 AB, 150 B, 87 A, 280/87 H, 87 C; 180/90; 74/493

[56] References Cited
UNITED STATES PATENTS

| | | | |
|---|---|---|---|
| 2,966,952 | 1/1961 | Wilfert | 180/90 |
| 3,341,248 | 9/1967 | Barenyli et al. | 296/70 |
| 3,439,769 | 4/1969 | Brilmeyer | 180/90 |
| 3,614,128 | 10/1971 | Sobkow | 180/90 |
| 3,702,081 | 11/1972 | Arnston | 74/492 |
| 3,702,706 | 11/1972 | Sobkow | 280/150 AB |
| 3,774,713 | 11/1973 | Stegmaier | 280/150 B |
| 3,801,126 | 4/1974 | Knight et al. | 180/90 |
| 3,850,447 | 11/1974 | Nagazumi et al. | 280/150 B |

FOREIGN PATENTS OR APPLICATIONS

| | | | |
|---|---|---|---|
| 1,115,317 | 12/1955 | France | 280/150 B |

Primary Examiner—M. Henson Wood, Jr.
Assistant Examiner—Jack D. Rubenstein
Attorney, Agent, or Firm—Herbert Furman

[57] ABSTRACT

A vehicle body includes an energy absorbing steering column having a forward portion rigidly secured to the forward wall of the body and a rearward portion slidably connected by energy absorbing structure to the forward portion for movement forwardly thereof under impact. A rigid bracket structure extends rearwardly from the forward body wall. Impact releasable structure secures the column bracket structure to the rearward portion of the column. The rigid bracket structure guides movement of the column bracket structure during forward movement of the rearward column portion. A knee panel is mounted on the body opposite the driver and includes a center portion which partially surrounds the lower part of the rearward column portion and driver knee deformable side portions to each side of the center portion. A U-shaped bracket has its base secured to the center portion of the knee panel and has its legs straddling the rearward column portion and secured to the rigid bracket structure, to assist in blocking deformation of the center portion into the rearward column portion.

1 Claim, 4 Drawing Figures

OCCUPANT KNEE RESTRAINT

This invention relates generally to a vehicle driver knee restraint and more particularly to the mounting of such a knee restraint on the vehicle.

The knee restraint is disclosed in detail in copending application Ser. No. 276,084 Arntson et al., filed July 28, 1972 and assigned to the assignee of this invention. Generally the knee restraint includes a center portion and a pair of driver knee deformable side portions. The center portion partially surrounds the lower part of the rearward or movable portion of an energy absorbing steering column which is impact secured to releasably rigid bracket structure mounted on a forward wall of the body. The side portions extend to each side of the center portion and are deformed by engagement with the driver's knees to absorb the kinetic energy and apply a resultant compressive load longitudinally of the femurs of the driver to control the kinematics of the upper torso of the driver with respect to the rearward column portion. The upper and lower edges of the side portions are secured to the rigid bracket structure and to other fixed body structure to ensure the desired kinetic energy absorption by deformation thereof, and the application of the desired resultant loads thereby to the driver's knees when impacted to control driver kinematics. In accordance with this invention, the center portion of the knee restraint is secured to the rigid bracket structure by a mounting arrangement to help restrict deformation of the center portion into the rearward column portion and possible interference with column collapse. In the preferred embodiment, the mounting arrangement includes a generally U-shaped bracket having its base secured to the center portion below the rearward column portion. The legs of the bracket straddle the column portion and are secured to the rigid bracket structure adjacent and outwardly of the impact releasable securement of the column portion to the rigid bracket structure.

The primary feature of this invention is that it provides a mounting arrangement for a driver knee restraint which ensures energy absorbing collapse of a steering column assembly without interference by surrounding the column assembly with a rigid bracket which reduces deformation of the knee restraint into the column assembly.

This and other features of the invention will be readily apparent from the following specification and drawings wherein.

Figure 1:
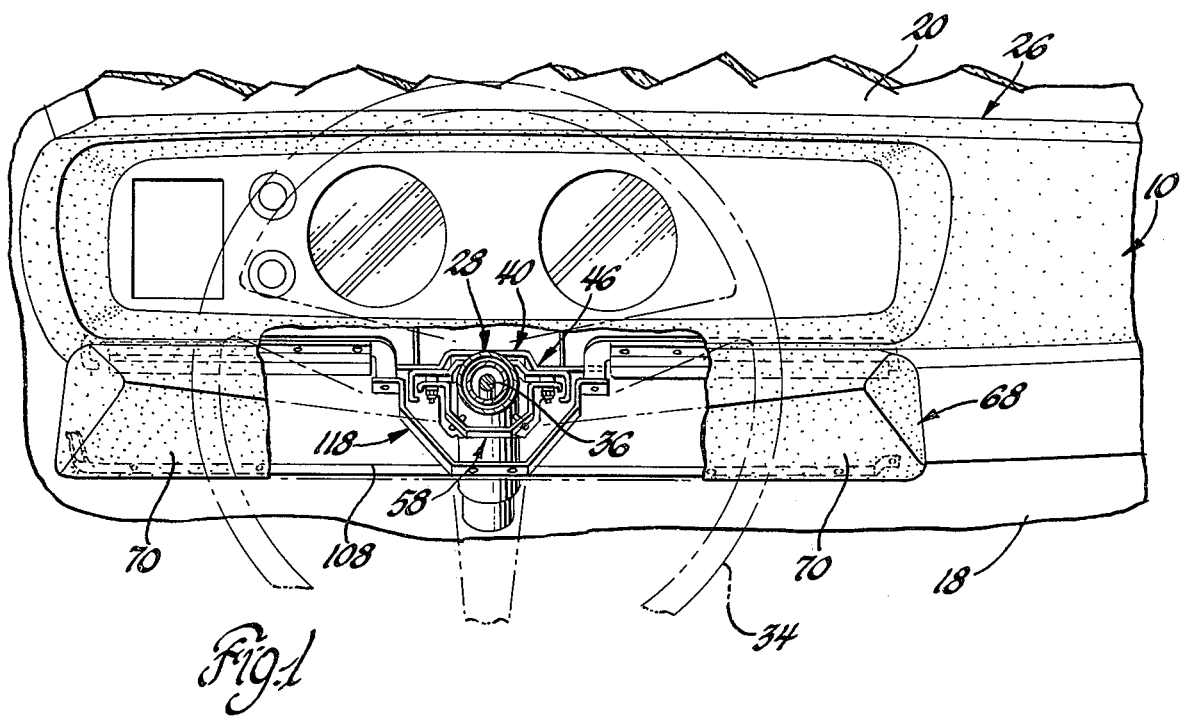
FIG. 1 is a partially broken away elevational view showing a mounting arrangement according to this invention.
Figure 2:
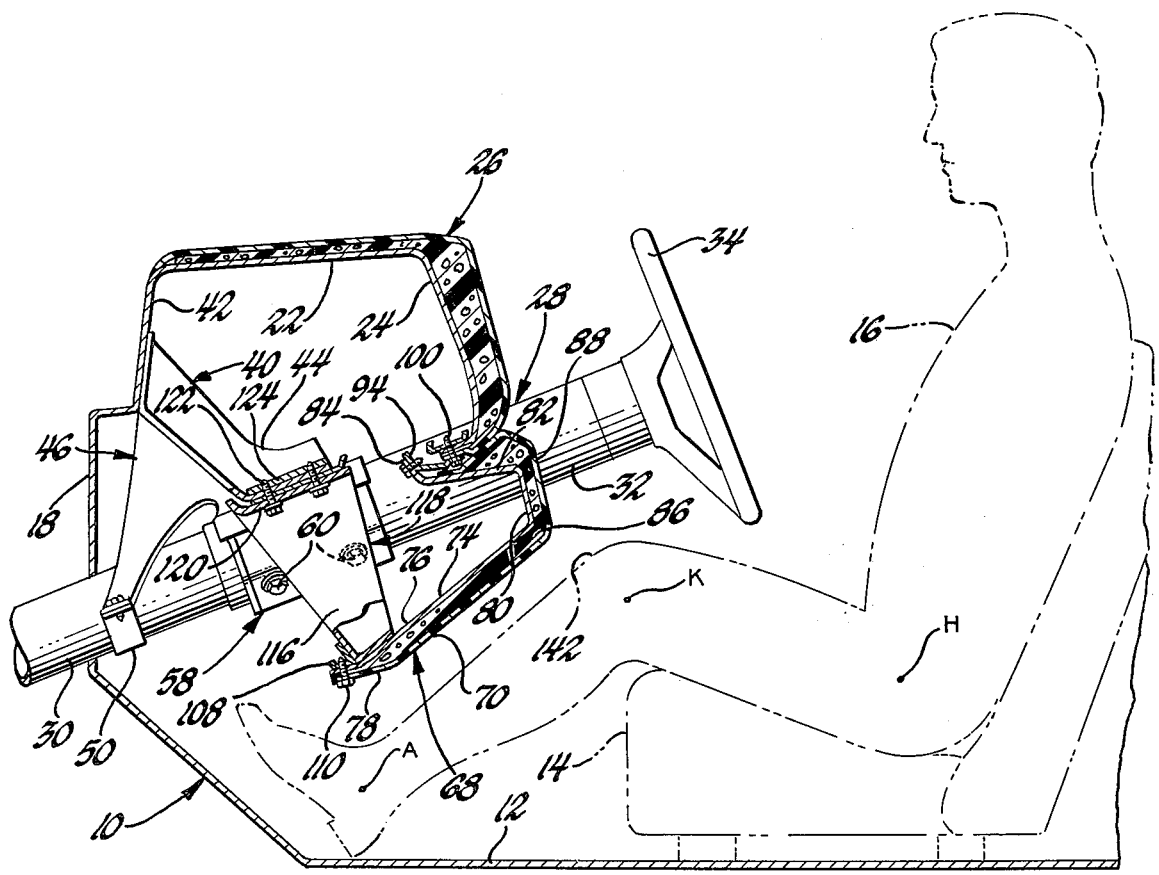
FIG. 2 is a view showing the relationship of the mounting arrangement to the knee restraint.

Referring now to FIGS. 1 and 2, a vehicle designated generally 10 includes a floor pan 12 which supports a schematically indicated conventional front seat 14 for supporting the vehicle driver 16 in seated attitude. The vehicle likewise includes a forward wall 18 which is conventionally known as a fire wall or cowl structure and a windshield 20 which extends upwardly and rearwardly of the vehicle. An upper wall portion 22 and a rear wall portion 24, formed integrally with the remainder of wall 18, provide the instrument panel 26 of the body. The instrument panel is conventionally covered with suitable energy absorbing material and an outer decorative covering.

The vehicle 10 further includes an energy absorbing steering column assembly 28. The assembly 28 is the same as that disclosed in U.S. Pat. No. 3,702,081 Arntson, issued Nov. 7, 1972 and assigned to the assignee of this invention. Only a brief description of the column necessary for an understanding of this invention will therefore be given.

The assembly 28 includes a forward portion 30 which is rigidly secured at its lower end to a portion of the wall 18. The assembly 28 further includes a rearward portion 32 which is telescopically related, as shown, to the portion 30 and is adapted for movement axially thereof and forwardly of the body during collapse of the column when loaded by the driver 16. The column portions 30 and 32 are interconnected by suitable means which normally maintains them against relative telescopic movement and absorbs energy during such movement. A conventional steering wheel 34 is rotatably mounted on the column portion 32 and is secured to the conventional steering mechanism of the body by a steering shaft 36 shown in FIG. 3. Also as shown therein, a shift tube 38 concentrically surrounds the shaft 36 to connect the shift lever mechanism with the transmission.

Figure 3:
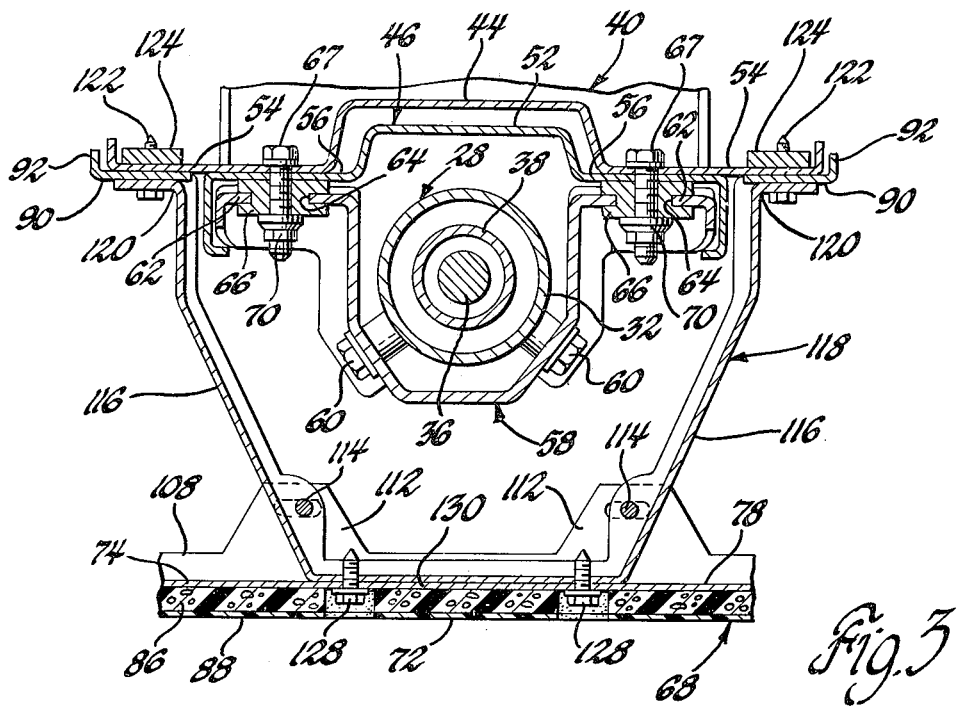
FIG. 3 is an enlarged view of a portion of FIG. 1.
Figure 4:
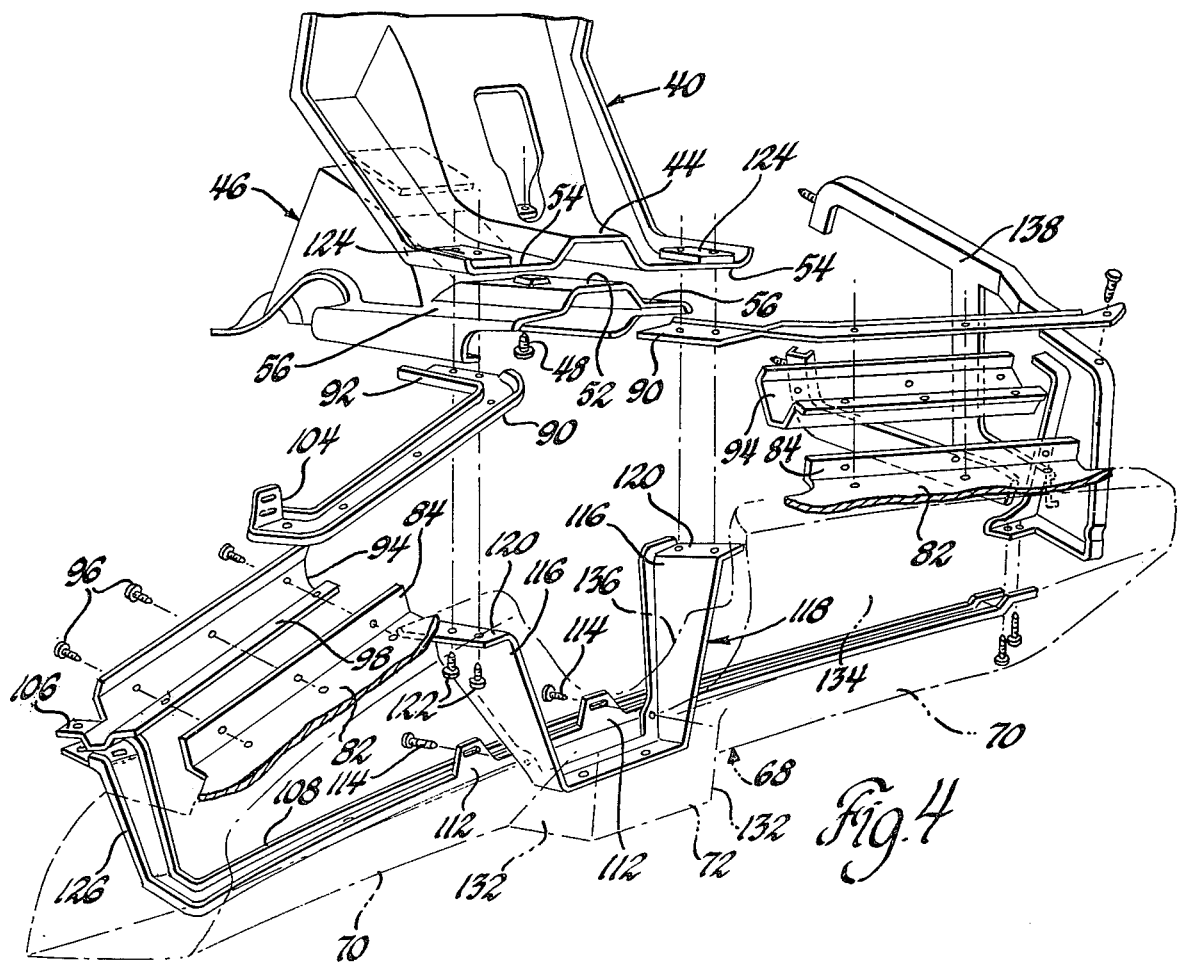
FIG. 4 is a partially broken away, blown apart perspective view of a portion of FIG. 1.

A steering column support bracket 40, FIGS. 2, 3 and 4, has its forward end rigidly secured to a wall portion 42 of wall 18 adjacent the wall portion 22. The rearward end portion of the bracket 40 is offset and shaped to provide a flattened generally U-shaped portion 44, FIGS. 3 and 4, which spans the portion 32 of the steering column assembly 28. A steering column guide bracket 46 is bolted at 48, FIG. 4, to bracket 40, and secured at 50, FIG. 2, to column portion 30 to support this column portion on wall 18. The rearward offset portion 52 thereof is shaped in generally the same manner as the portion 44 of bracket 40 and fits therewithin in spaced relationship, as shown in FIG. 3, except for their respective abutting lateral flanges 54 and 56 to each side of the column portion 32. The abutting flanges are provided with aligned apertures. A generally U-shaped bracket 58, FIG. 3, is suitably bolted at 60 to the column portion 32 and includes lateral flanges 62 which are slotted at 64, with the slots 64 being closed at their forward ends with respect to the body and open at their rearward ends with respect to the body. A side slotted mounting capsule 66 is slidably received in each of the slots 64 and is impact releasably secured to a respective flange 62 by a series of plastic shear pins, not shown, which may be injection molded within aligned apertures in the capsules and in the flanges. Each capsule includes a closed slot. A bolt 67 extends through the aligned apertures in the abutting flanges 54 and 56 of the bracket portions 44 and 52 and the closed slots in each capsule 66 and is retained by a nut 70 to support the column portion 32 on the forward wall 18 of the body.

When the steering wheel 34 is engaged by the upper torso of the driver 16 with a predetermined force, the resultant load is transferred from the steering wheel to the upper column portion 32 through the hub of the steering wheel. When the component of this load which is directed axially of the column reaches a predetermined minimum magnitude, the plastic shear pins which interconnect the flanges 62 and the capsules 66 are fractured and the column portion 32 is thereby released for movement axially of the column portion 30 as the energy absorbing means connecting the column portions functions to absorb the energy of the axial load. During such movement, the bracket 58 moves with the column portion 32 and the flanges 62 slide along and are guided by the bracket portion 52 of bracket 46 after the flanges are released from the slots of the capsules.

It can be seen from FIG. 3 that flanges 62 are provided with side extensions which are received within generally L-shaped side extensions of flanges 56 to control movement of column portion 32 laterally or downwardly of column portion 30.

From the foregoing description, it can be seen that the performance of the steering column 28 is dependent upon the axial component of the impact load applied to the column by the driver. It is therefore desirable that this load be applied coaxially of the column or with minimum deviation therefrom. In order to accomplish this, the kinematics of the driver 16 should be such that the upper torso of the driver rotate in a forward direction relative to the vehicle about the H point or hip axis indicated in FIG. 2 and that the lower torso of the driver move only a limited distance forwardly of the seat 14 whereby the driver remains on the seat and maximum rotation of his torso about the H point will occur.

With reference to FIG. 2 the H point or hip axis of the driver is indicated by the letter H, the K point or knee axis is indicated by the letter K, and the A point or ankle axis is indicated by the letter A. It is assumed that the driver's legs are laterally aligned so that the H, K and A points of the driver's legs are coaxial. The full lines connecting the H, K and A points indicate the normal seated position of the driver under nonimpact conditions. The driver's feet are normally located adjacent the toe pan portion of wall 18. Although his feet may move slightly forwardly under impact conditions, the A points can be considered relatively stationary during such conditions. Under impact conditions, the lower legs of the driver swing forwardly and upwardly of the vehicle about the A points. The upper leg portions of the driver concurrently move forwardly and upwardly of the vehicle so that the H points move forwardly and the angularity of the axes K–H of the femurs decreases with respect to the axes K–A of the lower leg portions. The engagement of the frontal surfaces of the knees of the occupant with an occupant knee restraint 68 applies a resultant compressive load axially of the femurs of the upper leg portions of the occupant and aids in producing maximum forward rotation of the upper torso of the driver about the H point as it moves forwardly.

The knee restraint 68 includes a pair of knee deformable side portions 70 interconnected by a center portion 72 which partially surrounds the lower part of the upper portion 32 of the column. The center portion is rigidly connected to the brackets 40 and 46 by the mounting arrangement of this invention to ensure that if any accidental deformation of this center portion by the driver's knees should occur, it cannot be deformed into the column portion 32 to thereby restrict movement of this column portion relative to the column portion 30 and in turn detract from the overall performance of the column.

The knee restraint includes a formed metal base or back 74 which is capable of energy absorption with square wave efficiency for the duration of the impact of the driver's knees with the side portions 70 of the restraint. Each side portion 70, FIG. 2, includes a knee-engageable first frontal wall or part 76 angled to the vertical and having an offset attachment flange 78 to the lower edge thereof. A second frontal wall 80 extends angularly to wall 76 and to the vertical and merges into an upper wall 82 which terminates in an offset attachment flange 84 for a portion of the extent thereof. The walls 76 of the knee restraint are normally engaged by the driver's knees intermediate the upper and lower junctures thereof with walls 80 and flanges 78 respectively. The base 74 is covered with soft foam material 86 which absorbs very little energy under impact conditions other than normal. Its primary purposes are to aid in distributing the loads over the walls 76 and to aid in "pocketing" the driver's knees. The foam material is covered with an outer decorative covering 88, preferably of a supported vinyl fabric or similar material which blends colorwise and aesthetically with the interior of the vehicle. The upper and lower edges of the covering are cemented to wall 82 and to the foam opposite flange 78.

With reference to FIG. 4, the manner in which the left hand side portion 70 is secured to the vehicle will be described. It is understood that the securement of the right hand side portion 70 is the same unless otherwise noted. A generally J-shaped instrument panel tie bar 90 is of channel cross section and has an inboard leg 92 engaging the flange 54 of the portion 44 of bracket 40, FIG. 3. The inner wall of the leg 92 is cut away so that this leg of the tie bar can nest underneath the flange 54. A flange of an offset knee restraint upper tie bar 94 nests against the offset flange 84 of wall 82 and is secured thereto by a plurality of sheet metal screws 96 extending through the flange of the tie bar 94 and the flange 84. Another offset flange 98 of the tie bar 94 nests against the lower edge of the instrument panel, FIG. 2, and a plurality of sheet metal screws 100 extend through aligned openings in the tie bar 90 and in the tie bar 94 to secure the upper edge of portion 70 and the lower edge of the instrument panel to the tie bars 90 and 94 and in turn rigidly anchor them to the bracket 40, as will be described.

The outboard leg of the bracket 90 includes an upwardly offset slotted ear 104 which is bolted to suitable bracket structure mounted on the A pillar of the body. An apertured ear 106 of tie bar 94 nests underneath and is bolted to the outboard leg of the tie bar 90 to further secure these together adjacent their outboard ends. A knee restraint lower tie bar 108 of channel cross section extends along the lower edge of the knee restraint as shown in FIG. 4. The base of tie bar 108 nests against the flange 78 of wall 76 and is secured thereto at a number of places 110, FIG. 2. The rearward leg of tie bar 108 is provided with a pair of slotted ears 112, FIG. 4, which are secured at 114 to flanged legs 116 of a U-shaped bracket 118. Bracket 118 forms part of the mounting arrangement of this invention as will be apparent from a further description. Flanges 120 of the legs 116 bear against respective legs 92 of the tie bar 90, FIG. 3, and bolts 122 extend through aligned apertures in the flanges 120, legs 92, and flanges 54 and are received within tapped blocks 124 welded to the flange 54 to thereby rigidly anchor the tie bars 90, 94 and 108 to the bracket 40.

The outboard left-hand end of the tie bar 108 is offset upwardly at 126 as shown in FIG. 4 and is bolted to suitable bracket structure mounted on the A pillar of the body. This bracket structure may be the same as that for the bars 90 and 94.

The base of bracket 118 is bolted at 128, FIG. 3, to the lower wall 130 of the center portion 72 of the knee restraint. Wall 130 is a continuation of flange 78 and merges into wall 76 through side wall 132, FIG. 4. It also merges into forward wall 134 which terminates in an arcuate flange 136 which defines an arcuate opening receiving the portion 32 of column 28. The center portion 72 is thus of boxlike shape and may provide a housing for an air conditioning outlet if desired. The walls 130, 132 and 134 and flange 136 of the center portion are covered with the foam material 86 and covering 88. The bracket 118 surrounds the portion 32 of the column 28 as shown in FIG. 4 and is located within the center portion 72. It can be therefore seen that the bracket 118 assists in blocking deformation of the center portion 72 of the knee restraint into the steering column due to engagement of the driver's knees therewith. Thus, the overall performance of the column cannot be influenced by any deformation of the knee restraint.

The left-hand tie bars 90 and 94 rigidly anchor the upper edge of the left-hand side portion 70 of the knee restraint to the bracket 40 and in turn are anchored at their outboard ends to the A pillar of the vehicle, which is a fixed body structure. The lower edge of the left-hand side portion 70 is anchored to the bracket 118 and also to the A pillar. Thus, the left-hand side portion 70 has its upper and lower edges rigidly anchored to fixed vehicle body structure so that any engagement thereby by the driver's knee will result in energy absorption deformation of wall 76 rather than deformation of the instrument panel or release of the knee panel from the instrument panel and the fixed vehicle body structure.

The right-hand side portion 70 is anchored to the brackets 40 and 118 in the same manner as the left-hand side portion 70 by like numbered tie bars 90 and 94 and the right-hand continuation of tie bar 108. The right-hand ends of the tie bars 90 and 108 may either be secured to additional tie bars which carry them through a knee panel for the right-hand front seat passenger or may be secured to the forward wall 18 of the body by suitable bracket structure, such as the bracket 138 indicated in FIG. 4.

From the foregoing description, it can be seen that the bracket 118 of the mounting arrangement of this invention assists to restrict deformation of portion 72 into the column 28. The bracket surrounds the column and rigidly anchors the center portion 72 to the support structure of the column. The securement of bracket 118 to the bracket 40 by bolts 122 is located outboard and to each side of the impact releasable securement of column portion 32 to brackets 40 and 46 to protect this securement against interference from the knee restraint.

Thus, this invention provides an improved occupant knee restraint.

We claim:

1. The combination comprising, an automotive vehicle including an occupant compartment for supporting a driver in seated attitude, an energy absorbing steering column assembly for absorbing the kinetic energy of the upper torso of said driver when engaged thereby, column support means mounted on the vehicle, means mounting said steering column assembly to said column support means, a knee restraint including a center portion partially surrounding the lower part of said steering column assembly and a pair of knee deformable side portions, each located to one side of said steering column assembly and engageable by the knees of said driver to absorb kinetic energy of the lower torso of said driver and control the kinematics of the upper torso of said driver with respect to said steering column assembly, and rigid generally U-shaped bracket means including a base portion connected to said center portion of said knee restraint below said lower part of said steering column assembly and spaced leg portions, each located to one side of said steering column assembly and secured to said column support means, said bracket means being spaced from said column assembly and blocking deformation of said center portion into said steering column assembly upon engagement of said driver's knees with said knee restraint.

* * * * *